United States Patent Office 2,743,279
Patented Apr. 24, 1956

2,743,279

PROCESS OF PREPARING 3-PYRAZOLIDONES

George A. Reynolds and John F. Tinker, Rochester, N. Y., assignors to Eastman Kodak Company, Rochester, N. Y., a corporation of New Jersey No Drawing. Application August 3, 1953,
Serial No. 372,167

12 Claims. (Cl. 260—310)

This invention relates to a process for the preparation of 3-pyrazolidone compounds having the general formula:

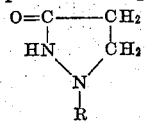

wherein R represents either a mononuclear aryl group of the benzene series or a heterocyclic nucleus such as those of the benzothiazole series. The 3-pyrazolidone compounds of the invention are particularly useful as developing agents for photographic silver halide emulsion layers.

The 3-pyrazolidone compounds of the invention having the above general formula are prepared by heating a β-hydroxy fatty acid hydrazide having the general formula:

wherein the R group is as above mentioned, and $n$ is 2, 3 or 4 in an inert organic solvent having a boiling point of at least about 110° C., such as toluene or xylene, and in the presence of an acid dehydration catalyst such as p-toluenesulfonic acid. Heating of the hydrazine under these conditions brings about cyclization of the hydrazide whereby the corresponding 3-pyrazolidone is formed.

Various 3-pyrazolidones have previously been prepared by methods such as the reaction of hydrazine hydrate with an α, β-olefine carboxylic acid or by the reaction of a hydrazine with a β-halogen-substituted fatty acid such as described in U. S. Patent 2,289,367. The 3-pyrazolidones have also been obtained by hydrolysis of pyrazolines as shown by British Patent 679,677. 3-pyrazolidones having allegedly also been prepared directly by the reaction of β-propiolactone with hydrazine or a hydrocarbon substituted hydrazine as described in British Patent 650,911. However, Gresham et al., J. A. C. S. 73, 3168, (1951), in a detailed study, have shown that the reaction product of β-propiolactone and aromatic hydrazines, such as phenylhydrazine, is a mixture of hydroacrylamide and β-alanine compounds, and our own work has shown, as will be seen hereinafter, that hydroxy fatty acid hydrazides are readily prepared by the reaction of β and γ-fatty acid lactones with hydrazines.

The following 3-pyrazolidones are representative of those which can be prepared by the process of our invention:

1-phenyl-3-pyrazolidone
1-m-nitrophenyl-3-pyrazolidone
1-p-nitrophenyl-3-pyrazolidone
1-p-chlorophenyl-3-pyrazolidone
1-p-cyanophenyl-3-pyrazolidone
1-p-β-methanesulfonamidoethylphenyl-3-pyrazolidone
1-p-β-hydroxyethylphenyl-3-pyrazolidone
1-(p-carboxymethylphenyl)-3-pyrazolidone
1-p-tolyl-3-pyrazolidone
1-o-tolyl-3-pyrazolidone
1-m-tolyl-3-pyrazolidone
1-(2-benzothiazolyl)-3-pyrazolidone As mentioned, the 3-pyrazolidone compounds are prepared by cyclizing the corresponding hydroxy fatty acid hydrazides. The hydroxy fatty acid hydrazides can be prepared in good yields by reacting the appropriate hydrazine, such as phenyl hydrazines or heterocyclic hydrazines with β-propiolactone, β- or γ-valerolactone or γ-butyrolactone as shown in the following examples. Representative hydrazines useful in preparing the hydroxy fatty acid hydrazides by this process are the following:

4-morpholinomethylphenylhydrazine
p-β-Methanesulfonamidophenylhydrazine
Phenylhydrazine
o-, m-, p-Tolylhydrazine,
o-, m-, p-Nitrophenylhydrazines,
o-, m-, p-Chlorophenylhydrazines,
p-Cyanophenylhydrazine,
o-, m-, p-Bromophenylhydrazines,
p-β-Hydroxyethylphenylhydrazine,
2-benzothiazolylhydrazine Representative β-hydroxy fatty acid hydrazides useful in making the 3-pyrazolidones are therefore:

N-β-hydroxypropio-N'-p-β-hydroxyethylphenylhydrazide
N-β-hydroxypropio-N'-phenylhydrazide
N-β-hydroxypropio-N'-p-cyanophenylhydrazide
N-β-hydroxypropio-N'-p-nitrophenylhydrazide
N-β-hydroxypropio-N'-p-chlorophenylhydrazide
N-β-hydroxypropio-N'- p -methylsulfonamidoethylphenylhydrazide
N-β-hydroxyvalero-N'-phenylhydrazide
N-γ-hydroxybutyro-N'-phenylhydrazide
N-γ-hydroxyvalero-N'-phenylhydrazide Other hydroxy fatty acid hydrazides which can be used in the process contain the N'-substituents of the above hydrazines.

Our process is unique in that it has been observed that if the above hydroxy fatty acid hydrazide compounds are heated in inert organic solvent media in the absence of an acid dehydration catalyst, no 3-pyrazolidone is obtained. Also, it appears essential that the hydrozy fatty acid hydrazides be heated in the presence of a dehydration catalyst in inert solvent media which have a minimum boiling point of at least about 110° C., such as o-xylene, toluene, 1,1,2-trichloroethane, 1,2-diethoxyethane and chlorobenzene. That is, when the hydroxy fatty acid hydrazides are heated in the presence of the dehydration catalyst in lower boiling solvents, such as benzene, n-butanol, 2-ethoxyethanol, methyl isobutyl ketone, etc., cyclization does not take place and no 3-pyrazolidone compound has been found in the reaction mixture. Moreover, in our process, hydracrylyl hydrazide, obtained by reaction of hydrazine in β-propiolactone, does not cyclize to form the expected compound 3-pyrazolidone. Furthermore, we have found that the process apparently does not yield the expected 3-pyrazolidone if employed with hydroxy fatty acid hydrazides having the above general formula in which R is either a hydroxymethylphenyl, o-hydroxyethylphenyl, methoxyphenyl, acetamidophenyl, acetoxyphenyl, hydroxyphenyl or aminophenyl group. Presumably, the nuclei representing R must therefore contain only inert substituents and must be free of those substituents indicated.

New 3-pyrazolidones prepared as described hereinafter have the above general formula wherein the R group in the 1-position of the 3-pyrazolidone nucleus represents either p-β-hydroxylethylphenyl, 2-benzothiazolyl, p-β- methansulfonamidophenyl, p-cyanophenyl or the 3-pyrazolodonobenzyl ether group:

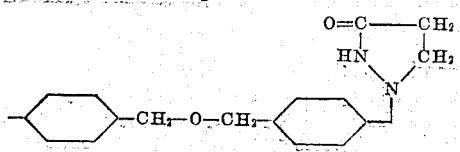

Dehydration catalysts suitable for use in our process include the substantially non-volatile strong inorganic acids such as hydrochloric acid, sulfuric acid, p-toluenesulfonic acid, and methanesulfonic acid.

The following examples illustrate the process of our invention:

EXAMPLE 1

The 1-(hydroxyalkylphenyl)-3-pyrazolidones, the hydroxyalkyl group of which preferably contain from 2 to 4 carbon atoms, are new compounds which are particularly valuable inasmuch as the hydroxyalkyl group increases the solubility of the compound by means of a neutral solubilizing group. These compounds retain the valuable characteristics of the parent 1-phenyl-3-pyrazolidone compound particularly as a silver halide developing agent, whereas in other 3-pyrazolidone compounds containing for example 1-sulfophenyl or 1-carboxyphenyl groups, the development activity is altered somewhat.

*1-(p-β-hydroxyethylphenyl)-3-pyrazolidone* p-β-Hydroxyethylphenylhydrazine was prepared by treatment of aqueous p-β-hydroxyethylbenzenediazonium chloride with sodium bisulfite. The compound was isolated as the free base in 68% yield. A sample was recrystallized from benzene-ethanol, M. P. 127–129°.

*Analysis*—Calcd. for $C_8H_{12}N_2O$: C, 63.2; H, 7.9; N, 18.6. Found: C, 63.6; H, 8.2; N, 18.6.

The above hydrazine was then dissolved in a mixture of benzene and 1,4-dioxane and an equivalent amount of β-propiolactone was added which resulted in the formation of N-β-hydroxypropio-N'-p-β-hydroxyethylphenylhydrazide in 63% yield. A sample was recrystallized from ethanol, M. P. 137–138.5°.

*Analysis*—Calcd. for $C_{15}H_{14}N_2O_3$: C, 59.0; H, 7.1; N, 12.5. Found: C, 59.4; H, 7.4; N, 12.4.

1-(p-β-hydroxyethylphenyl)-3-pyrazolidone was prepared by refluxing for one hour a solution of 10 grams of the above hydrazide in 400 cc. of xylene to which 10 cc. of a N/2 solution of p-toluenesulfonic acid in xylene had been added. The reaction mixture contained the above desired pyrazolidone compound and some polymerized 1-(p-vinylphenyl)-3 pyrazolidone. To the cool mixture was added 100 cc. of ligroin, and the mixture was kept at 0–5° for 30 minutes. The solution was decanted, and the thin taffy that remained extracted with portions of ethyl acetate. The solutions were evaporated to a small volume, cooled, and seeded. There was obtained 5.9 g., 64% yield, of material, M. P. 82–100°. Further recrystallization from ethyl acetate yielded 3.1 g. of product, M. P. 106–109°, with rather poor recovery due to ready solubility. A sample recrystallized from alcohol-ethyl acetate and ethyl acetate-hexane having a melting point of 109–110° was analyzed.

*Analysis*—Calcd. for $C_{11}H_{14}N_2O_2$: C, 64.1; H, 6.8; N, 13.6. Found: C, 63.2; H, 6.8; N, 13.2.

EXAMPLE 2

*1-phenyl-3-pyrazolidone*

N-β-hydroxypropio-N'-phenylhydrazide was prepared as follows:

To a solution of β-propiolactone (14.4 g.; 0.2 mole) in 100 ml. of benzene was slowly added, with stirring, 21.6 g. (0.2 mole) of phenylhydrazine. A white solid began to separate almost immediately, and the solution became warm. The reaction mixture was heated on the steam bath for an hour with stirring. After cooling to 10°, the white solid was collected and air dried (yield 28.5 g. or 80%). A sample on recrystallization from ethyl acetate melted at 141–142° and analyzed satisfactorily. The M. P. of the crude product was 138–140°.

In preparing the desired product 1-phenyl-3-pyrazolidone, a 10-g. sample of the crude product from the reaction described above was dissolved in 75 mol. of hot xylene. To this solution was added 0.5 g. of p-toluenesulfonic acid, and the solution refluxed, using a Dean and Stark water separator, until no more water was collected. On cooling, white crystals of 1-phenyl-3-pyrazolidone separated and were collected on a Buchner funnel. More of the product was obtained when the filtrate was diluted with an equal volume of petroleum ether. The yield of product was 6 g. (66%), melting at 115–117°. After one recrystallization from ethyl acetate, the M. P. was raised to 120–121°, and there was no depression in M. P. when the product was mixed with a sample of 1-phenyl-3-pyrazolidone prepared by a different procedure.

EXAMPLE 3

*N-p-tolyl-N'-β-hydroxypropiohydrazide*

To a solution of 11.2 g. of p-tolylhydrazine in 35 ml. of dry benzene was added 5.7 ml. of β-propiolactone. After 4 hours at room temperature, the mixture was cooled, filtered, and the solid recrystallized from a mixture of ethyl acetate and ethanol. The yield of N-p-tolyl-N'-β-hydroxypropiohydrazide, M. P. 132–136° C., was 5.6 g. or 31%. A sample was recrystallized several times from ethyl acetate for analysis (M. P. 135–136° C.).

*Analysis*—Calcd. ($C_{10}H_{14}N_2O_2$, M. W. 194): C, 62.0; H, 7.2; N. 14.4. Found: C, 62.6; H, 7.3; N, 14.5.

*1-p-tolyl-3-pyrazolidone*

A solution of 10.8 g. of N-p-tolyl-N'-β-hydroxypropiohydrazide in 225 ml. of xylene containing 1 g. of p-toluene-sulfonic acid was refluxed for 2½ hours; then 85 ml. of xylene was distilled off, and the mixture cooled and filtered. The filtrate was further evaporated, cooled, and filtered. A total of 7.3 g. of crude 1-p-tolyl-3-pyrazolidone (75%), M. P. 152–156° C., was obtained. A crystallization from ethyl acetate (73% recovery) raised the melting point to 159–161° C.

EXAMPLE 4

*N-p-nitrophenyl-N'-β-hydroxypropiohydrazide*

Fifty grams of p-nitrophenylhydrazine in 650 ml. of dioxane was treated with 20 ml. of β-propiolactone. The mixture was allowed to stand overnight, then evaporated to a thick slurry, filtered, and the solid recrystallized from ethanol. A crude yield of 24 g. (33%) of yellow solid, M. P. 160–171° was obtained. The sample prepared for analysis had M. P. 174–175°.

*Analysis*—Calc'd for $C_9H_{11}N_3O_4$, M. W. 225: C, 48.0; H, 4.9; N, 18.7. Found: C, 48.4; H, 5.2; N, 18.9.

*1-p-nitrophenyl-3-pyrazolidone*

A mixture of 23 g. of the recrystallized N-p-nitrophenyl-N'-β-hydroxypropiohydrazide, 2 g. of p-toluenesulfonic acid, and 500 ml. of xylene was refluxed under a Dean-Stark trap for 80 minutes, and the source of heat removed. The mixture, cooled to 25°, was filtered, and the solid recrystallized from a mixture of ethyl acetate and ethanol. The first crop amounted to 5.3 g. (25%), M. P. 194–197°. A sample for analysis, placed in the bath at 205°, melted at 212–214°.

*Analysis*—Calc'd for $C_9H_9N_3O_3$, M. W. 207: C, 52.2; H, 4.3; N, 20.3. Found: C, 51.7; H, 4.5; N, 19.4.

EXAMPLE 5

*N-p-cyanophenyl-N'-β-hydroxypropiohydrazide*

A solution of 21.5 g. of p-cyanophenylhydrazine in 400 ml. of hot benzene was treated with 11 ml. of β- propiolactone, and the mixture refluxed for 2 hours. The mixture was cooled to room temperature and filtered, the filtrate evaporated and cooled, yielding 9.7 g. (30%) of crude product, M. P. 154–158 C. A sample recrystallized for analysis from ethyl acetate melted at 159–160 C.

Calcd ($C_{10}H_{11}N_3O_2$, M. W. 205): C, 58.5; H, 5.4; N, 20.5. Found: C, 58.2; H, 5.0; N, 20.8.

1-p-cyanophenyl-3-pyrazolidone

A mixture of 4.5 g. of N-p-cyanophenyl-N'-β-hydroxypropiohydrazide and 300 ml. of xylene was heated to boiling, and 10 ml. of 0.5 N p-toluenesulfonic acid in dry xylene was added. The mixture was refluxed under a water separator for 1 hour, cooled, and the xylene decanted. The residue was recrystallized twice from a mixture of ethyl acetate and ethanol, yielding 0.6 g. (15%) of product, M. P. 194–195°, of analytical purity.

Analysis.—Calc'd for $C_{10}H_9N_3O$, M. W. 187: C, 64.2; H, 4.8; N, 22.4. Found: C, 63.5; H, 5.0; N, 22.2.

EXAMPLE 6

N-p-methanesulfonamidoethylphenyl-N'-β-hydroxypropiohydrazide

A solution of 17.5 g. of p-β-methanesulfonamidoethylphenylhydrazine in 250 ml. of warm dioxane was treated with 4.8 ml. of β-propiolactone. After the solution had stood some time, 30 ml. of saturated aqueous potassium carbonate was added, and the mixture shaken intermittently for several hours. The upper phase was separated, and dried over solid potassium carbonate; a dark oil separated during the last steps; it was discarded. The dry solution was evaporated to dryness, and the resulting taffy was recrystallized twice from a mixture of ethyl acetate and ethanol, yielding 4.1 g. (18%) of solid, M. P. 113–114°. The crude yield is larger, but the purity is unsatisfactory.

Analysis.—Calc'd for $C_{12}H_{19}N_3O_4S$, M. W. 301: C, 47.9; H, 6.3; N, 13.9; S, 10.6. Found: C, 48.1; H, 7.0; N, 14.2; S, 10.3.

1-p-β-methanesulfonamidoethylphenyl-3-pyrazolidone

A suspension of 4.1 g. of N-p-β-methanesulfonamidoethylphenyl-N'-β-hydroxypropiohydrazide in 350 ml. of xylene and 0.5 g. of p-toluenesulfonic acid was refluxed under a water separator for 90 minutes. The mixture was cooled to 20° C. and the xylene decanted. The residue was recrystallized from a mixture of ethyl acetate and ethanol, yielding 2.5 g. (65%) of crude product, M. P. 133–135° C. A sample for analysis was recrystallized from ethanol, M. P. 142–144° C.

Analysis.—Calc'd for $C_{12}H_{17}N_3O_3S$, 283: C, 50.9; H, 6.0; N, 14.8; S, 11.3. Found: C, 51.2; H, 5.8; N, 14.7; S, 11.3.

EXAMPLE 7

N-2-benzothiazolyl-N'-β-hydroxypropiohydrazide

A mixture of 15 g. of 2-hydrazinobenzothiazole, 100 ml. of benzene, 250 ml. of dioxane, and 6 ml. of β-propiolactone was refluxed for 2 hours, then cooled to room temperature and filtered. There was obtained 3.1 g. of solid, M. P. 200–201°, the infrared absorption of which shows a strong carbonyl absorption, which is missing in the spectrum of the starting material.

Analysis.—Calc'd for $C_{10}H_{11}N_3O_2S$: C, 50.7; H, 4.6; N, 17.7. Found: C, 51.3; H, 4.9; N, 17.9.

1-(2-benzothiazolyl)-3-pyrazolidone

A solution of 2.8 g. of the hydrazide in 200 ml. of 1,1,2-trichloroethane was heated to reflux, 2 ml. of methanesulfonic acid added, and the solution refluxed for two hours.

The solution was cooled, and crystals separated after some time. Fractional recrystallization from ethyl alcohol yielded 100 mg. of product, M. P. 215–216° C.

Analysis.—Calc'd for $C_{10}H_9N_3OS$ (mol. wt. 219): C, 54.8; H, 4.1; S, 14.6. Found: C, 54.5; H, 4.5; S, 14.4.

EXAMPLE 8

N-β-hydroxypropio-N'-o-tolylhydrazide

A dry benzene solution of o-tolylhydrazine, prepared from 22 g. of the hydrochloride, was treated with 8.7 ml. of β-propiolactone and allowed to stand overnight. The slurry was filtered at 25°; no more material could be isolated from the mother liquors, yielding 18.4 g., 68%, of crude product. Recrystallization from ethanol in 78% recovery yielded satisfactory material, M. P. 135–137° C. The analytical sample melted at 138–139° C.

Analysis.—Calc'd for $C_{10}H_{14}N_2O_2$ (mol. wt. 194): C, 62.0; H, 7.2; N, 14.4. Found: C, 62.0; H, 7.5; N, 15.4, 15.3.

1-(O-tolyl)-3-pyrazolidone

A solution of 10 g. of the above hydrazide in 100 ml. of hot 1,1,2-trichloroethane was treated with 2 ml. of methanesulfonic acid, and the mixture refluxed for 3 hours. The solution was cooled well and filtered, yielding 2.6 g. (29%) of product, M. P. 195–197° C. A little more was obtained from the mother liquors.

A sample, recrystallized from ethyl acetate, was analyzed.

Analysis.—Calc'd: C, 68.2; H, 6.8; N, 15.9. Found: N, 16.2.

EXAMPLE 9

N-β-hydroxypropio-N'-m-tolylhydrazide

This compound was prepared in a fashion identical to the preparation of the above ortho isomer. From 45 g. of the salt and 18 ml. of β-propiolactone was obtained 20.6 g. (37%) of crude hydrazide, recrystallized with 52% recovery, melting at 112–113° C. An analytical sample melted at 117–118° C.

Analysis.—Calc'd for $C_{10}H_{14}N_2O_2$ (mol. wt. 194): C, 62.0; H, 7.2; N, 14.4. Found: C, 61.9; H, 7.5; N, 14.8.

1-(m-tolyl)-3-pyrazolidone

This compound was prepared in the same manner as the above ortho isomer except that no solid appeared when the trichloroethane solution was cooled. The solution was evaporated to dryness, and fractionally crystallized from ligroin-ethyl acetate. Finally, 300 mg. of product of analytical purity was obtained, M. P. 178–179° C.

EXAMPLE 10

N-p-hydrazinobenzylmorpholine

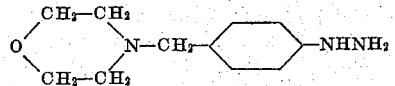

This hydrazine was prepared from N-p-aminobenzylmorpholine (J. Am. Chem. Soc., 60, 896 (1938)) in the same way as p-β-hydroxyethylphenylhydrazine. It was used without purification.

For its characterization the benzal derivative was prepared. Benzal-p(4 morpholinomethyl) - phenylhydrazone has M. P. 153–154° C., recrystallized from alcohol.

N-β-hydroxypropio-N'-4-(4 - morpholinomethyl)phenylhydrazide

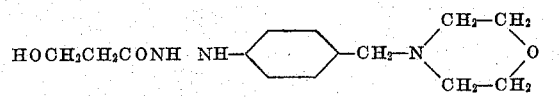

Sixteen grams of N-p-hydrazinobenzylmorpholine was dissolved in benzene, the solution filtered, and 4.8 ml. of β-propiolactone added. After several days, the benzene was evaporated and the residue crystallized from ethyl acetate. The first crop amounted to 5.4 g. 25% yield, M. P. 130–134° C. Another recrystallization gave a sample of M. P. 132–134° C.

Bis-4-(3-oxo-1-pyrazolidino)-benzyl ether

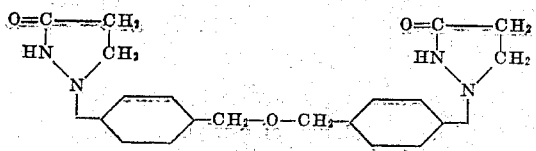

The hydrazide, N-β-hydroxypropio-N'-4-(4-morpholinomethyl)-phenylhydrazide (5.4 g.), was refluxed with 500 ml. of xylene and 1 g. of p-toluenesulfonic acid for 3 hours. The cooled mixture was filtered from some unidentified polymerix material, and evaporated to dryness. The residue was crystallized from ethyl acetate, yielding 2.2 g., 59% yield of product (M. P. 122–124 C.).

*Analysis.*—Calc'd for C₂₂H₃₀N₄O₃: C, 66.3; H, 7.5; N, 14.1. Found: C. 67.2; H, 7.7; N, 14.4.

EXAMPLE 11

N-β-hydroxyvalero-N'-phenylhydrazide

A dry benzene solution of phenylhydrazine was treated with 20.5 g. of β-valerolactone and allowed to stand overnight. The slurry was cooled and filtered, yielding 19.3 g. of crude product. Recrystallization from ethyl acetate in 81% recovery yielded satisfactory material, M. P. 117–118° C.

*Analysis.*—Calc'd: C, 63.5; H, 7.7; N, 13.5. Found: C. 63.8; H, 7.6; N, 13.3.

N-γ-hydroxybutyro-N'-phenylhydrazide was prepared as described in Ber. 60, 1399.

EXAMPLE 12

N-γ-hydroxyvalero-N'-phenylhydrazide

A mixture of 100 cc. of phenylhydrazine and 100 cc. of γ-valerolactone were heated at 90° C. overnight. The mixture was allowed to cool and 95 g. of solid separated. This was recrystallized from a mixture of ethyl alcohol-ethyl acetate, yielding 44 g. (47%) of compound; after further recrystallization, a compound of M. P. 82–83° C. was recovered.

*Analysis.*—Calc'd: C, 63.5; H, 7.7; N, 13.5. Found: C, 61.7; H, 8.0; N, 14.7.

What we claim is:

1. A method for preparing a 3-pyrazolidone which comprises heating a compound having the general formula

R—NH—NH—CO—CH₂CH₂—OH wherein R represents a member of the class consisting of p-β-hydroxyethylphenyl, phenyl, o-tolyl, m-tolyl, p-tolyl, m- and p-nitrophenyl, p-cyanophenyl, p-β-methanesulfonamidoethylphenyl, p-chlorophenyl and p-(4-morpholinomethyl)-phenyl groups, in an inert organic solvent having a boiling point of at least about 110° C., in the presence of an acid dehydration catalyst and at a temperature sufficient to form said 3-pyrazolidone.

2. A method for preparing 1-phenyl-3-pyrazolidone which comprises heating N-β-hydroxypropio-N'-phenylhydrazide in an inert organic solvent having a boiling point of at least about 110° C., in the presence of an acid dehydration catalyst and at a temperature sufficient to form 1-phenyl-3-pyrazolidone.

3. A method for preparing 1-phenyl-3-pyrazolidone which comprises heating N-β-hydroxypropio-N'-phenylhydrazine in xylene at reflux temperature in the presence of p-toluenesulfonic acid until 1-phenyl-3-pyrazolidone is obtained.

4. A method for preparing 1-(p-β-hydroxyethylphenyl)-3-pyrazolidone which comprises heating N-β-hydroxypropio-N'-p-β-hydroxyethylphenylhydrazide in an inert organic solvent having a boiling point of at least 110° C., in the presence of an acid dehydration catalyst and at a temperature sufficient to form said first-mentioned compound.

5. A method for preparing 1-(p-β-hydroxyethylphenyl)-3-pyrazolidone which comprises heating N-β-hydroxypropio-N'-p-β-hydroxyethylphenylhydrazide in xylene at reflux temperature in the presence of p-toluenesulfonic acid until said first-mentioned compound is obtained.

6. A method for preparing 1-(p-cyanophenyl)-3-pyrazolidone which comprises heating N-p-cyanophenyl-N'-β-hydroxypropio-hydrazide in xylene at reflux temperature in the presence of p-toluenesulfonic acid until said first-mentioned compound is obtained.

7. A method for preparing a 1-nitrophenyl-3-pyrazolidone which comprises heating a N-nitrophenyl-N'-β-hydroxyethylpropiohydrazide in xylene in the presence of p-toluenesulfonic acid until said first-mentioned compound is obtained.

8. A method for preparing 1-p-nitrophenyl-3-pyrazolidone which comprises heating N-p-nitrophenyl-N'-β-hydroxyethylpropio-hydrazide in xylene at reflux temperature in the presence of p-toluenesulfonic acid until said first-mentioned compound is obtained.

9. A method for preparing a 1-tolyl-3-pyrazolidone which comprises heating a N-tolyl-N'-β-hydroxypropiohydrazide in an inert organic solvent having a boiling point of at least about 110° C., in the presence of an acid dehydration catalyst and at a temperature sufficient to form said 3-pyrazolidone.

10. A method for preparing 1-p-tolyl-3-pyrazolidone which comprises heating N-p-tolyl-N'-β-hydroxypropiohydrazide in xylene at reflux temperature in the presence of p-toluenesulfonic acid until 1-p-tolyl-3-pyrazolidone is obtained.

11. The process of claim 1 wherein the organic solvent is xylene and the catalyst is p-toluenesulfonic acid.

12. The process of claim 1 wherein the organic solvent is toluene and the catalyst is methanesulfonic acid.

References Cited in the file of this patent

UNITED STATES PATENTS

| | | |
|---|---|---|
| 2,289,367 | Kendall | July 14, 1942 |
| 2,688,024 | Kendall et al. | Aug. 31, 1954 |

FOREIGN PATENTS

| | | |
|---|---|---|
| 650,911 | Great Britain | Mar. 7, 1951 |
| 679,677 | Great Britain | Sept. 24, 1952 |

OTHER REFERENCES

Spasov et al.: Chem. Abst., vol. 44, col. 1491 (1950).